US008208443B2

(12) United States Patent
Rangaiah et al.

(10) Patent No.: US 8,208,443 B2
(45) Date of Patent: Jun. 26, 2012

(54) APPARATUS AND METHOD FOR CELL RESELECTION IN A RADIO ACCESS NETWORK

(75) Inventors: Raghavendra Rangaiah, Surrey (GB); Andrew Farnsworth, Surrey (GB); Gideon Roberts, Surrey (GB)

(73) Assignee: Research In Motion Limited, Waterloo, Ontario (CA)

( * ) Notice: Subject to any disclaimer, the term of this patent is extended or adjusted under 35 U.S.C. 154(b) by 459 days.

(21) Appl. No.: 12/463,169

(22) Filed: May 8, 2009

(65) Prior Publication Data

US 2009/0286539 A1 Nov. 19, 2009

Related U.S. Application Data

(60) Provisional application No. 61/052,194, filed on May 10, 2008.

(51) Int. Cl.
*H04W 4/00* (2009.01)
(52) U.S. Cl. .................................. 370/331; 455/435.1
(58) Field of Classification Search .................. 370/310, 370/328, 329, 331; 455/403, 422.1, 434, 455/436
See application file for complete search history.

(56) References Cited

U.S. PATENT DOCUMENTS

| 5,768,267 A * | 6/1998 | Raith et al. ...................... 370/329 |
| 6,377,803 B1 * | 4/2002 | Ruohonen ...................... 455/434 |
| 6,978,142 B2 * | 12/2005 | Jokimies ........................ 455/449 |
| 7,463,887 B2 * | 12/2008 | Roberts et al. .............. 455/435.2 |
| 7,483,702 B2 * | 1/2009 | Yeo et al. ....................... 455/449 |
| 7,630,718 B2 * | 12/2009 | Choi .............................. 455/441 |
| 7,653,390 B2 * | 1/2010 | Roberts ........................... 455/434 |
| 7,860,462 B2 * | 12/2010 | Sarkkinen et al. ............... 455/69 |
| 2004/0162074 A1 * | 8/2004 | Chen ............................... 455/437 |
| 2004/0202140 A1 * | 10/2004 | Kim et al. ....................... 370/335 |
| 2007/0037577 A1 * | 2/2007 | Dalsgaard et al. ............. 455/436 |
| 2009/0067386 A1 * | 3/2009 | Kitazoe .......................... 370/332 |
| 2009/0088154 A1 * | 4/2009 | Umatt et al. .................... 455/434 |
| 2009/0238117 A1 * | 9/2009 | Somasundaram et al. ..... 370/328 |

FOREIGN PATENT DOCUMENTS

EP 1562393 A1 8/2005

OTHER PUBLICATIONS

3GPP TSG-RAN WG2 Meeting #60; Title: E-UTRA Inter-Frequency Cell Reselection Aspects; Nokia; R2-074876; Jeju, Korea; Nov. 5-9, 2007; 10 pgs. EPO Search and Examination Report; EP Application No. 09159765.8; Sep. 3, 2009; 5 pgs.
3GPP TS 25.304 v.8.1.0; 3rd Generation Partnership Project; Technical Specification Group Radio Access Network; User Equipment (UE) Procedures in Idle Mode and Procedures for Cell Reselection in Connected Mode; Release 8; Mar. 2008; 41 pgs.

* cited by examiner

*Primary Examiner* — Chi Pham
*Assistant Examiner* — Robert Lopata
(74) *Attorney, Agent, or Firm* — Conley Rose, P.C.; J. Robert Brown, Jr.

(57) ABSTRACT

A method for cell reselection from a serving cell to another cell in a radio access network covering a geographical area divided into a plurality of cells, the method comprising: attempting to reselect to a first other cell with a higher rank value than the serving cell; setting up a channel on the first other cell and initiating a completion period; conditional on the completion period expiring before the first other cell is identified as being a suitable cell, receiving cell measurements for cells and creating a cell ranking list of the cells based on rank values of the cells; conditional on a second other cell having a higher rank value than the serving cell or first other cell, attempting to reselect to the second other cell.

17 Claims, 5 Drawing Sheets

APPARATUS AND METHOD FOR CELL RESELECTION IN A RADIO ACCESS NETWORK

CROSS-REFERENCE TO RELATED APPLICATIONS

The present application claims priority to U.S. provisional patent application No. 61/052,194, filed May 10, 2008, by Raghavendra Magadi Rangaiah, et al, entitled "Apparatus and Method for Cell Reselection in a Radio Access Network", which is incorporated by reference herein as if reproduced in its entirety.

TECHNICAL FIELD

This application relates to telecommunication systems in general, having for example application in UMTS (Universal Mobile Telecommunications System) and in particular relates to a method and apparatus for cell reselection from a serving cell to another cell in a radio access network (RAN).

BACKGROUND

In a typical cellular radio system, mobile user equipment (UE) communicates via a radio access network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that this disclosure is not intended to be limited to any particular mobile telecommunications system or standard.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

BRIEF DESCRIPTION OF THE DRAWINGS

Embodiments will now be described, by way of example only, with reference to the attached drawings, in which.

DETAILED DESCRIPTION OF THE DRAWINGS

Cell reselection for a UE is described in the 3GPP TS 25.304 specification, v 8.1.0, "User Equipment (UE) procedures in idle mode and procedures for cell reselection in connected mode" which is incorporated herein by reference and referred to herein as the 25.304 specification. Section 5.2.6 and in particular section 5.2.6.1.4 of the 25.304 specification describes the cell reselection evaluation process and cell reselection criteria.

Section 5.2.6.1.4 of the 25.304 specification specifies cell reselection criteria used for intra-frequency cells, inter-frequency cells and inter-RAT cells. A rank value in the form of cell-ranking criterion R is defined in this section of the 25.304 specification as $R_s$ for serving cells and $R_n$ for neighbouring cells.

The present teaching recognises that problems with existing cell reselection methods may include a delay in cell reselection, bad user experience, and call drops being experienced.

An aspect of the disclosure relates to a method for cell reselection from a serving cell to another cell in a radio access network covering a geographical area divided into a plurality of cells. The method may comprise: attempting to reselect to a first other cell with a higher rank value than the serving cell; setting up a channel on the first other cell and initiating a completion period; conditional on (or based on or dependent on) the completion period expiring before the first other cell is identified as being a suitable cell, receiving cell measurements for cells and creating a cell ranking list of the cells based on rank values of the cells; and conditional on (or based on or dependent on) a second other cell having a higher rank value than the serving cell or first other cell, attempting to reselect to the second other cell.

Another aspect of the disclosure relates to a mobile communication device for use in a radio access network covering a geographical area divided into a plurality of cells, comprising: one or more processors; a wireless transceiver coupled to the one or more processors; memory coupled to the one or more processors. The one or more processors may be operative to: attempt to reselect to a first other cell with a higher rank value than the serving cell; set up a channel on the first other cell and initiating a completion period; receive, conditional on (or based on or dependent on) the completion period expiring before the first other cell is identified as being a suitable cell, cell measurements for cells and create a cell ranking list of the cells based on rank values of the cells; attempt, conditional on (or based on or dependent on) a second other cell having a higher rank value than the serving cell or first other cell, to reselect to the second other cell.

Another aspect of the disclosure relates to a computer program product comprising program code stored on a computer readable medium. The program code may be arranged, in use, to: attempt to reselect to a first other cell with a higher rank value than the serving cell; set up a channel on the first other cell and initiating a completion period; receive, conditional on (or based on or dependent on) the completion period expiring before the first other cell is identified as being a suitable cell, cell measurements for cells and create a cell ranking list of the cells based on rank values of the cells; attempt, conditional on (or based on or dependent on) a second other cell having a higher rank value than the serving cell or first other cell, to reselect to the second other cell.

Figure 1:
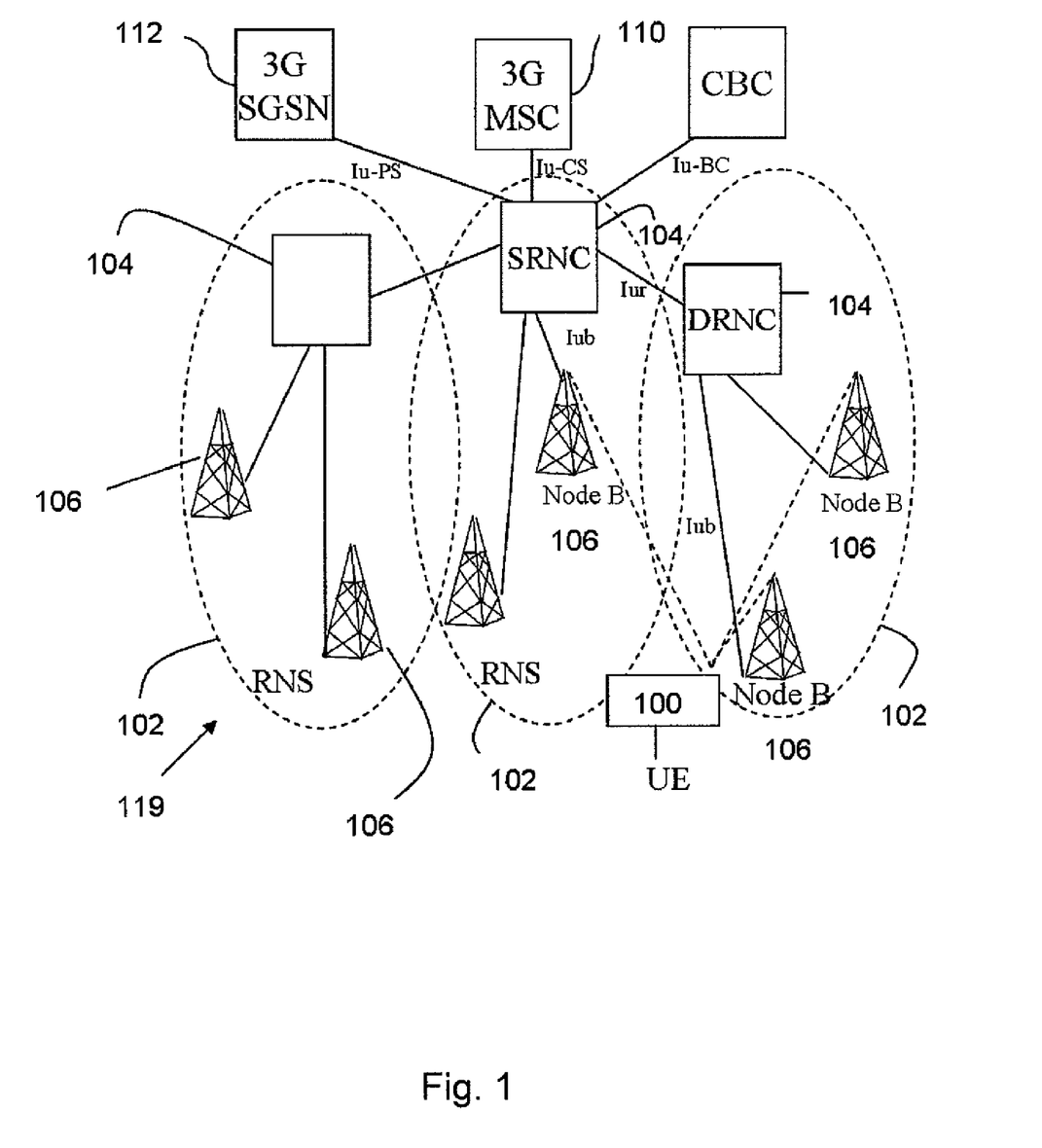
FIG. 1 is a schematic diagram showing an overview of a network and a UE device.

Other aspects and features of the present teaching will become apparent to those ordinarily skilled in the art upon review of the following description of specific embodiments of a method and apparatus for cell reselection in a telecommunication system and the accompanying claims. The method disclosed herein may be implemented in a user equipment device of a wireless communications network. Referring to the drawings, FIG. 1 is a schematic diagram showing an overview of a network and a user equipment device. Clearly in practice there may be many user equipment devices operating with the network but for the sake of simplicity FIG. 1 only shows a single user equipment device 100. For the purposes of illustration, FIG. 1 also shows a radio access network 119 (UTRAN) used in a UMTS system having a few components. It will be clear to a person skilled in the art that in practice a network will include far more components than those shown.

The network 119 as shown in FIG. 1 comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

Figure 2:
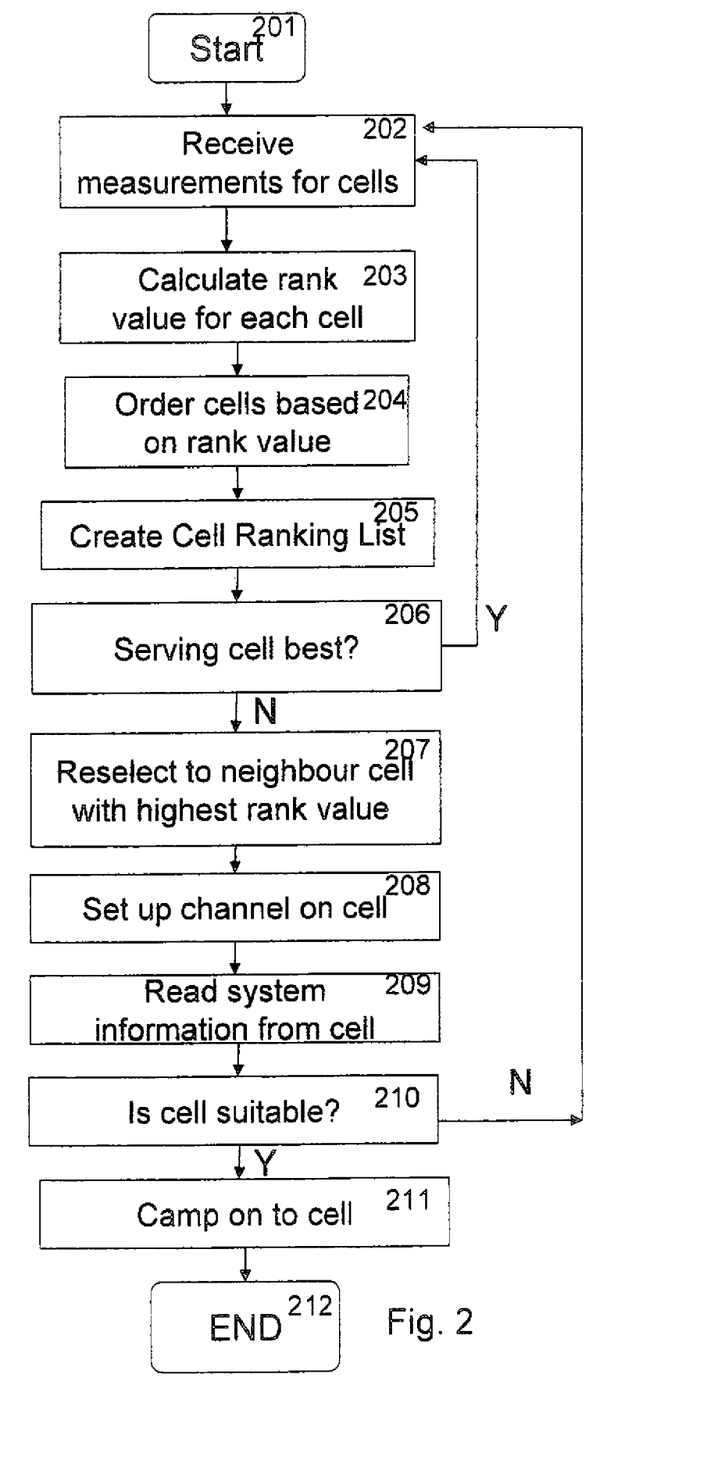
FIG. 2 is a flow diagram showing processes performed by a UE during a known cell reselection procedure.

FIG. 2 is a flow diagram showing processes performed by a UE during a known cell reselection procedure in a UMTS system.

Referring to FIG. 2 the process starts at 201. At 202, cell measurements, in one example intra-frequency, inter-frequency and inter RAT cell measurements, are generated or received by the UE. At 203 rank values are calculated for each cell. In one example these cells are the serving cell and neighbouring cells. One example of the calculation usable to calculate a rank value in the form of cell-ranking criterion R is defined in section 5.2.6.1.4 of the 25.304 specification (see the calculations for $R_s$ for serving cells and $R_n$ for neighbouring cells in that section). In that example the rank values are calculated for cells if they satisfy the conditions set in section 5.2.6.1.4 of the 25.304 specification.

At 204 the cells are ordered based on the rank values. In one example only cells with rank values better than that of the serving cell are considered and these are compiled in a list. At 205 the resulting Cell Ranking List is created. At 206 if the UE finds that the serving cell is best (i.e. has the highest rank value) then the UE remains camped on to the serving cell and the process reverts to 202.

If at 206 the UE finds that the serving cell is not the best (i.e. does not have the highest rank value) then at 207 the UE attempts to reselect to a neighbour cell with the highest rank value. To this end, at 208 a channel (in one example a Primary Common Control Physical Channel (PCCPCH)) is set up, at 209 system information (in one example in the form of Master Information Blocks (MIBs) and System Information Blocks (SIBs)) is read from the neighbour cell and at 210 a check is made that the cell is a suitable cell. A suitable cell is a cell on which a UE may camp; examples include a cell which has acceptable signal strength and/or is not in a forbidden location area and/or is not barred and/or for an automatic search, belongs to the correct Public Land Mobile Network (PLMN). If the cell is suitable the UE camps on to the neighbour cell at 211. If the cell is not a suitable cell, the process reverts to 202. The process ends at 212.

Figure 3:
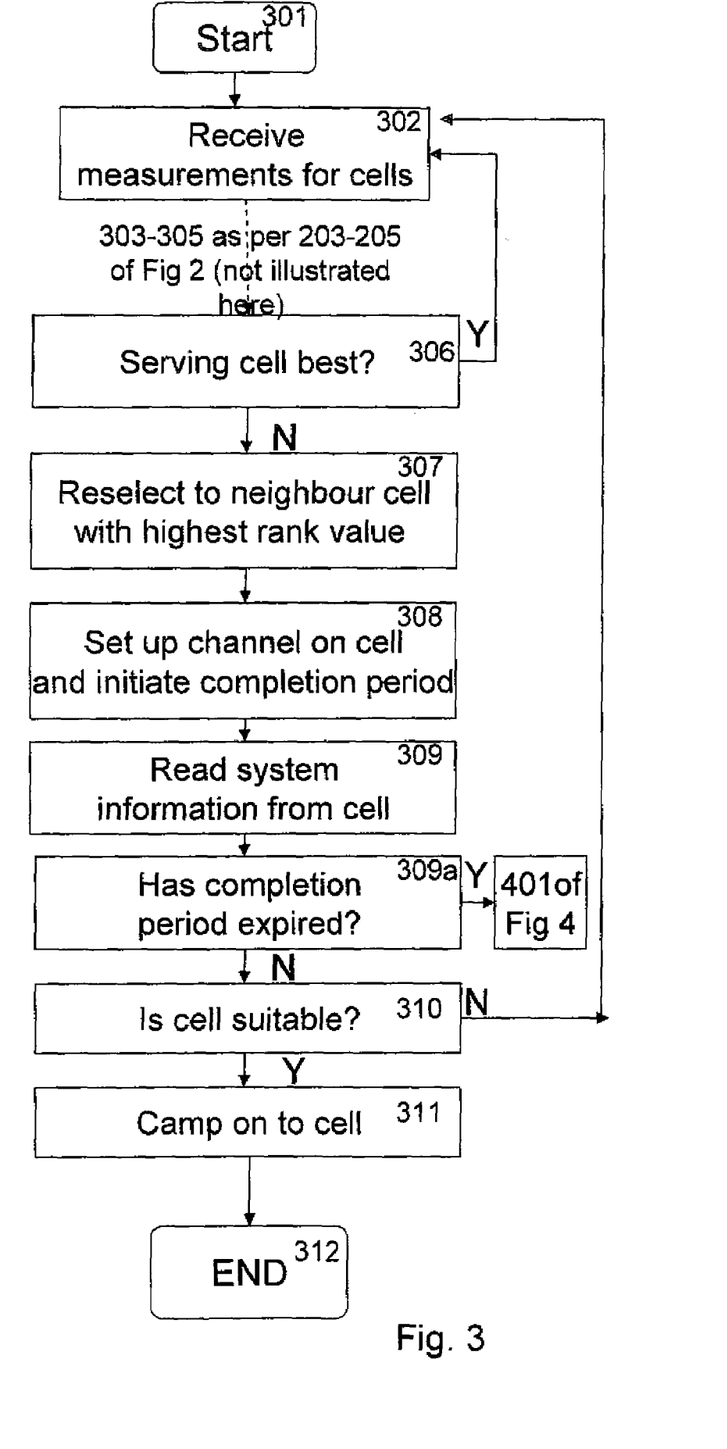
FIGS. 3 and 4 are flow diagrams showing processes performed by a UE during a cell reselection procedure in accordance with an embodiment of the present disclosure.
Figure 4:
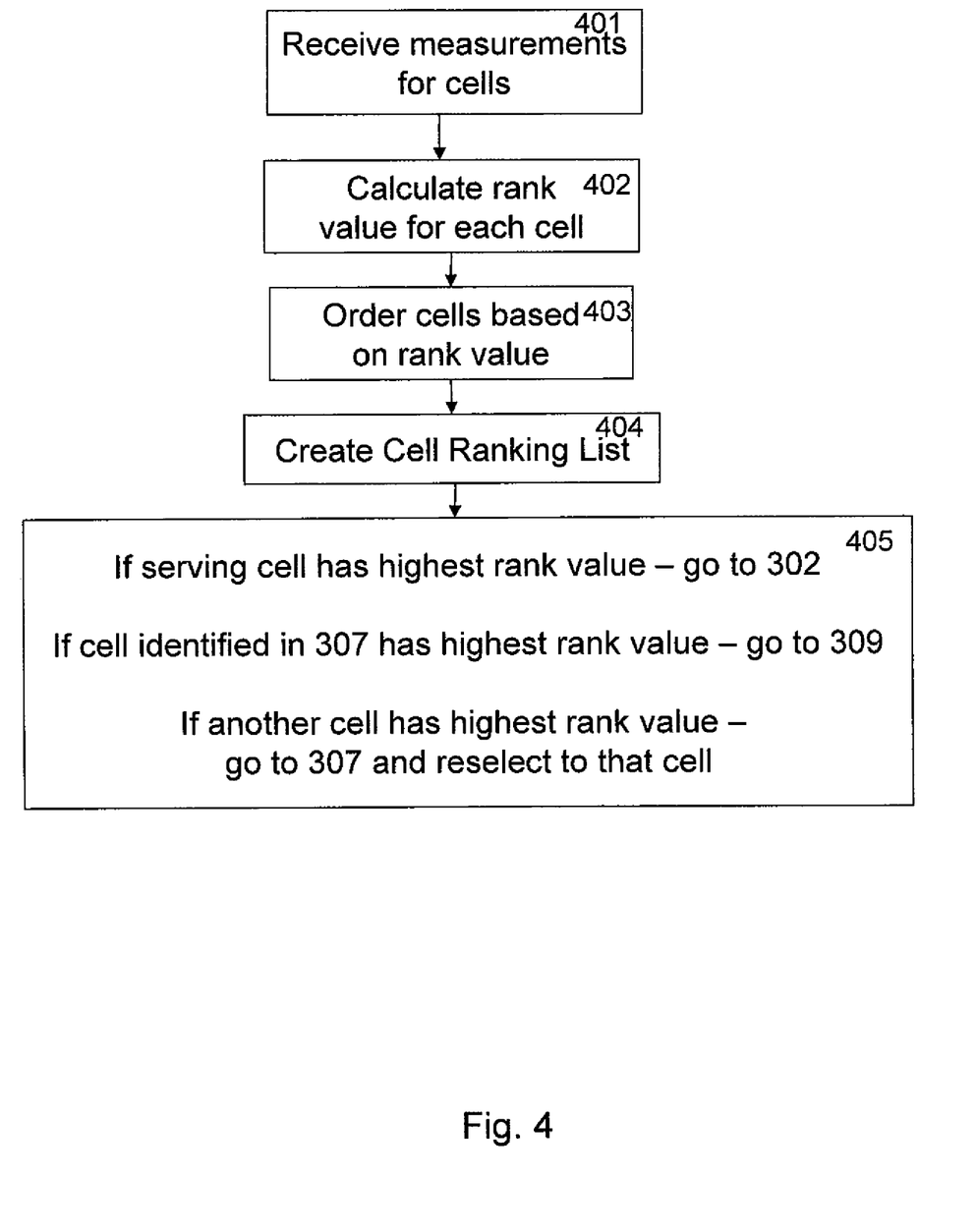

FIGS. 3 and 4 are flow diagrams showing processes performed by a UE during a cell reselection procedure in accordance with an embodiment of the present disclosure in a UMTS system.

Referring to FIGS. 3 and 4, actions 301-307 inclusive are identical to actions 201-207 of FIG. 2 and will not be repeated here (i.e. the description above for 201-207 should be read as a description of 301-307). At 308 a channel (in one example a Primary Common Control Physical Channel (PCCPCH)) is set up and a completion period is initiated. In one embodiment the completion period is initiated by starting a timer, although it can also be a count of a certain event such as missed SIBs or missed TBs. In one example the completion period expires after 1 second. In another embodiment, it expires after 2 seconds. In another embodiment it expires after a predetermined number of events such as missed SIBs has occurred.

At 309 system information (in one example in the form of Master Information Blocks (MIBs) and System Information Blocks (SIBs)) is read from the neighbour cell and at 310 a check is made that the cell is a suitable cell. If the cell is found to be a suitable cell at 310 before the completion period expires at 311 the UE camps on to the cell.

If at 309a the completion period expires before the cell is found to be suitable, for example because the UE cannot set up the channel (e.g. PCCPCH) or fails to read system information due to an error such as a cyclic redundancy check (CRC) error, the process moves to 401 of FIG. 4.

At 401, cell measurements, in one example intra-frequency, inter-frequency and inter RAT cell measurements, are generated in the UE. At 402 rank values are calculated for each cell, in one example theses cells are the serving cell and neighbouring cells. One example calculation for a rank value in the form of cell-ranking criterion R is defined in section 5.2.6.1.4 of the 25.304 specification (see the calculations for $R_s$ for serving cells and $R_n$ for neighbouring cells in that section). In that example the rank values are calculated for cells if they satisfy the conditions set in section 5.2.6.1.4 of the 25.304 specification. At 403 the cells are ordered based on the rank values. In one example only cells with rank values better than that of the serving cell are considered and these are compiled in a list. At 404 the resulting Cell Ranking List is created.

At 405, if the serving cell has the highest rank value the process reverts to 302. If the neighbouring cell previously identified in 307 has the highest value the process reverts to 309. If another neighbouring cell has the highest rank value the process reverts to 307 and the UE reselects to that cell.

The present teaching solves the problem where the UE may not be able to set up a channel (e.g. PCCPCH) or fails to read system information due to error issues (such as CRC error issues) on a presumptive best neighbour cell to which the UE is trying to reselect. This can result in a long delay in cell reselection, or dropped calls, even though other neighbouring suitable cells are available for camping. This creates a very poor user experience. By continuing cell measurements and processing at 401-405 of other cells as taught herein, the UE is capable of reporting dynamically the best cell efficiently. Accordingly, the strongest, suitable and best cell can be camped on without wasting time on a less reliable cell, where for example the channel cannot be read. This reduces delay, enables a better user experience and results in fewer call drops.

Figure 5:
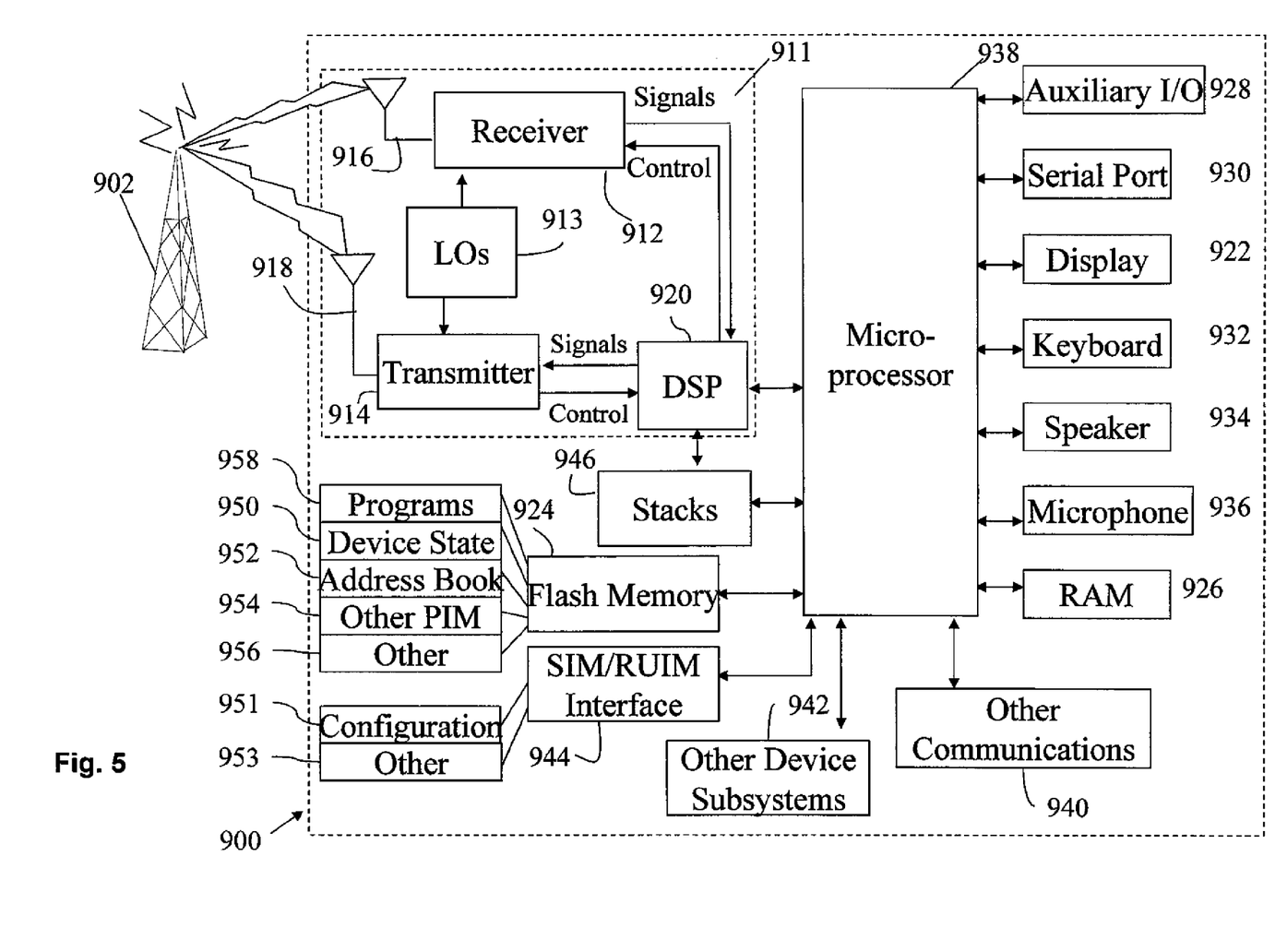
FIG. 5 is a block diagram illustrating a mobile device, which can act as a UE in accordance with the approach described herein.

Turning now to FIG. 5, this is a block diagram illustrating a mobile device, which can act as a UE and co-operate with the apparatus and methods of FIGS. 1 to 4, and which is an example wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" or "112" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 5 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 5, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

Extensions and Alternatives

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order, can be varied and as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

What is claimed is:

1. A method for cell reselection from a serving cell to another cell in a radio access network covering a geographical area divided into a plurality of cells, the method comprising:
attempting to reselect to a first other cell with a higher rank value than the serving cell;
setting up a channel on the first other cell and initiating a predetermined completion period for camping on the first cell;
dynamically reporting cell measurements for cells and creating a cell ranking list of the cells based on rank values of the cells;
conditional on the completion period not expiring before identifying the first cell as suitable:
camping on the first cell;
conditional on the completion period expiring before the first other cell is identified as suitable;
attempting to reselect to a second other cell having a higher rank value than the first cell or serving cell.

2. A method according to claim 1, further comprising:
conditional on the first other cell having the highest rank value, reading system information from the first other cell and checking that the first other cell is a suitable cell.

3. A method according to claim 1, further comprising:
conditional on the serving cell having the highest rank value, receiving cell measurements for cells, creating a cell ranking list of the cells based on rank values of the cells and checking that the serving cell has the highest rank value.

4. A method according to claim 1, wherein the cell measurements are intra-frequency, inter-frequency and inter RAT cell measurements.

5. A method according to claim 1, wherein the rank values are calculated for the serving cell and neighbouring cells.

6. A method according to claim 1, wherein the channel is PCCPCH.

7. A method according to claim 1, wherein the completion period is a predetermined period of time.

8. A method according to claim 1, wherein the completion period is defined by the occurrence of predetermined number of defined events.

9. A mobile communication device for use in a radio access network covering a geographical area divided into a plurality of cells, comprising:
one or more processors;
a wireless transceiver coupled to the one or more processors;
memory coupled to the one or more processors;
the one or more processors being operative to:
attempt to reselect to a first other cell with a higher rank value than the serving cell;
set up a channel on the first other cell and initiating a predetermined completion period for camping on the first cell;
dynamically report cell measurements for cells and create a cell ranking list of the cells based on rank values of the cells;

conditional on the completion period not expiring before identifying the first cell as suitable:
camp on the first cell; and
conditional on the completion period expiring before the first other cell is identified as suitable:
attempt to reselect to a second other cell having a higher rank value than the first cell or serving cell.

10. A mobile communication device according to claim 9, wherein the one or more processors are further operative to:
read, conditional on the first other cell having the highest rank value, system information from the first other cell and check that the first other cell is a suitable cell.

11. A mobile communication device according to claim 9, wherein the one or more processors are further operative to:
create, conditional on the serving cell having the highest rank value, receiving cell measurements for cells, a cell ranking list of the cells based on rank values of the cells and check that the serving cell has the highest rank value.

12. A mobile communication device according to claim 9, wherein the cell measurements are intra-frequency, inter-frequency and inter RAT cell measurements.

13. A mobile communication device according to claim 9, wherein the rank values are calculated for the serving cell and neighbouring cells.

14. A mobile communication device according to claim 9, wherein the channel is PCCPCH.

15. A mobile communication device according to claim 9, wherein the completion period is a predetermined period of time.

16. A mobile communication device according to claim 9, wherein the completion period is defined by the occurrence of predetermined number of defined events.

17. A computer program product comprising program code stored on a non-transitory computer readable medium, the program code arranged, in use, to:
attempt to reselect to a first other cell with a higher rank value than the serving cell;
set up a channel on the first other cell and initiating a predetermined completion period for camping on the first cell;
dynamically report cell measurements for cells and create a cell ranking list of the cells based on rank values of the cells;
conditional on the completion period not expiring before identifying the first cell as suitable:
camp on the first cell; and
conditional on the completion period expiring before the first other cell is identified as suitable:
attempt to reselect to a second other cell having a higher rank value than the first cell or serving cell.

* * * * *